US006842319B2

(12) United States Patent
Mahnert et al.

(10) Patent No.: US 6,842,319 B2
(45) Date of Patent: Jan. 11, 2005

(54) PROCEDURE FOR PRODUCING AN INITIATION SIGNAL AFTER THE CURRENT DIFFERENTIAL PROTECTION PRINCIPLE ARRANGEMENT

(75) Inventors: Hartmut Mahnert, Nuremberg (DE); Josef Nibler, Pilsach (DE)

(73) Assignee: Siemens Aktiengesellschaft, Munich (DE)

( * ) Notice: Subject to any disclaimer, the term of this patent is extended or adjusted under 35 U.S.C. 154(b) by 283 days.

(21) Appl. No.: 10/061,454

(22) Filed: Feb. 4, 2002

(65) Prior Publication Data

US 2002/0161485 A1 Oct. 31, 2002

(30) Foreign Application Priority Data

Feb. 5, 2001 (DE) .......................................... 101 06 279

(51) Int. Cl.[7] ................................................. H02H 3/00
(52) U.S. Cl. ........................................ 361/67; 361/93.6
(58) Field of Search ........................ 361/36, 93.1, 93.6, 361/62, 63, 64, 67, 68, 80, 87

(56) References Cited

U.S. PATENT DOCUMENTS 4,237,512 A * 12/1980 Forford ....................... 361/87

| 5,808,844 A | | 9/1998 | Schiel et al. ................... 361/45 |
| 6,442,010 B1 | * | 8/2002 | Kasztenny et al. ........... 361/63 |
| 6,483,680 B1 | * | 11/2002 | Kulidjian et al. ............. 361/36 |
| 6,625,551 B1 | * | 9/2003 | Gies et al. ..................... 702/58 |

FOREIGN PATENT DOCUMENTS

DE 44 36 254 C1 2/1996 ............ H02H/3/28

* cited by examiner

*Primary Examiner*—Ronald Leja
(74) *Attorney, Agent, or Firm*—Morrison & Foerster LLP

(57) ABSTRACT

The invention relates to a method and arrangement for generating a trigger signal according to the current differential protection principle when a fault occurs on a section of an electrical power supply system, in which differential current values and stabilization current values are detected and monitored with regard to exceeding limit values. A trigger signal is generated if positive results of the instances of monitoring are present. The differential current values and the stabilization current values are calculated with instantaneous values of the detected power supply currents as instantaneous values. A first measurement quantity and a second measurement quantity are formed, and a check is made to determine whether the two measurement quantities exceed a predetermined limit value of the differential quotient of the differential current with respect to time. If the instances of evaluation and the instances of monitoring produce positive results, the trigger signal is generated.

13 Claims, 2 Drawing Sheets

020
PROCEDURE FOR PRODUCING AN INITIATION SIGNAL AFTER THE CURRENT DIFFERENTIAL PROTECTION PRINCIPLE ARRANGEMENT

CLAIM FOR PRIORITY

This application claims priority to German Application No. 10106279.6 which was published in the German language on Feb. 5, 2001, the contents of which are hereby incorporated by reference.

TECHNICAL FIELD OF THE INVENTION

The invention relates to a system and method for generating a trigger signal, and in particular, to generating a trigger signal based on the current differential protection principle in the case of a fault on a section of an electrical power supply system.

BACKGROUND OF THE INVENTION

German patent specification DE 44 36 254 C1 discloses current transformers used to detect currents at the ends of a section of an electrical power supply system which is to be monitored with regard to the occurrence of an internal fault. In the known method, the currents obtained by means of the current transformers are converted, in a measured value preprocessing device, into root-mean-square-value-proportional measurement quantities, with which differential and stabilization current values are obtained. In order to detect a fault on the section of a power supply system that is to be monitored, differential current values are monitored with regard to exceeding a predetermined lower limit value of the differential current (differential current limit value) and with regard to exceeding stabilization current values weighted with a characteristic curve factor. The trigger signal is generated if positive results of the two instances of monitoring are present simultaneously.

In the known method, special precautions have to be taken to guard against incorrect triggering on account of saturation phenomena in the current transformers. This is because, under certain circumstances, current transformers transform the measured values completely satisfactorily only for in each case a limited short time span of each period, because they enter into saturation in the case of relatively large current values. As a result of the saturation phenomena in the current transformers, intrinsically external faults with regard to the section to be monitored may mistakenly be classified as internal faults, which can then lead to undesirable triggering. In order to prevent this, care is taken to ensure that the outputting of a trigger signal is blocked after an external fault has been ascertained in the state of unsaturated current transformers. In this case, the blocking is not performed for a fixedly predetermined time, but rather is effected for a predetermined time duration starting from an instant which depends on the respective conditions. After this time duration has elapsed, the known method can then respond again to an internal fault.

SUMMARY OF THE INVENTION

The invention relates to a system and method for generating a trigger signal, and in particular, to generating a trigger signal based on the current differential protection principle in the case of a fault on a section of an electrical power supply system, in which differential current values are monitored with regard to exceeding a predetermined lower limit value of the differential current (differential current limit value) and also with regard to exceeding stabilization current values weighted with a characteristic curve factor, and the trigger signal is generated if positive results of the two instances of monitoring are present simultaneously.

The invention also discloses a system and method for generating a trigger signal according to the current differential protection principle which can be used to generate a trigger signal rapidly and reliably in the case of an internal fault—while avoiding incorrect triggering in the case of external faults with transformer saturation.

In one embodiment of the invention, the differential current values and the stabilization current values are calculated with instantaneous values of the currents detected at the electrical power supply system, and a first measurement quantity, which is proportional to the differential quotient of the stabilization current with respect to time, is formed and checked in an evaluation operation to determine whether the first measurement quantity exceeds a predetermined limit value of the differential quotient of the differential current with respect to time (differential current quotient limit value). A second measurement quantity, which is proportional to the differential quotient of the differential current with respect to time, is formed and checked in a further evaluation operation to determine whether the second measurement quantity exceeds the differential current quotient limit value, and the trigger signal is generated if the two evaluation operations produce positive results at the same time as the two instances of monitoring.

An advantage of the invention is that the computational complexity can be kept comparatively low by virtue of the processing of instantaneous values of the currents detected on the electrical power supply system. This is also fostered by the fact that the evaluation operations proceed relatively simply in the method according to the invention, with the result that overall the computational complexity is comparatively low. On the other hand, with the method according to the invention, there is the advantageous possibility of performing the computation operations at comparatively short intervals, without having to use a relatively large data processing device.

In order to preclude, with particularly high certainty, incorrect triggering in the case of external faults with accompanying saturation of the current transformers, in another embodiment of the invention, a check is made to determine whether the first measurement quantity is greater than the second measurement quantity, and, if appropriate, the trigger signal is generated.

Furthermore, in order to further increase the reliability of the invention, it is preferable if a check is made to determine whether the second measurement quantity exceeds the first measurement quantity weighted with the characteristic curve factor, and, if appropriate, the trigger signal is generated.

In order to prevent an apparent fault location outside the section from being identified on account of impedance differences in the supplies in the case of a fault on the section of the electrical power supply system that is to be monitored, in another embodiment of the invention, the smallest value of the stabilization current is determined in each case in a time range in which the first measurement quantity becomes less than zero, and its largest value is determined in each case in a time range in which the first measurement quantity becomes greater than zero, and a check is made to determine whether the stabilization current is greater than KMIN times the smallest value of the stabilization current, where 1<KMIN<√2, and 0.5 times the value of the largest value, and, if appropriate, the trigger signal is generated.

In still another embodiment of the invention, the trigger signal is generated if the evaluation operations and the instances of monitoring have yielded positive results Ns times in succession, where Ns is freely selectable. As a result, it is possible to effect high-speed triggering if Ns is chosen to be very small, e.g. Ns=1 or Ns=2.

If high-speed triggering cannot be achieved, then it is advantageous that, in the absence of Ns results, the trigger signal is generated when at least the instances of monitoring have produced positive results Nz times, where Ns<<Nz.

In the invention, in order to avoid incorrect triggering, it is preferable if, in the absence of a trigger signal, an internal inhibit signal is generated if the first measurement quantity is greater than the limit value of this quantity, furthermore the second measurement quantity is less than the instantaneous value—weighted with the k factor—of the first measurement quantity and, at the same time, the instantaneous value of the stabilization current is greater than a limit value, a first reweighted limit value, a second reweighted limit value, and a comparison value calculated as mean value from previous values.

The invention also relates to a current differential protection arrangement for a section of an electrical power supply system having a measured value preprocessing device, in which respective differential current values and stabilization current values respectively assigned thereto are formed continuously from currents detected at the ends of the section, having an evaluation device connected downstream of the measured value preprocessing device, in which evaluation device the differential current is checked to determine whether it exceeds a predetermined differential current limit value, and having a logic circuit, which, on the input side, is connected to the evaluation device and has an output for outputting a trigger signal. Such a current differential protection arrangement is described in the German patent specification DE 44 36 254 C1, which was already dealt with in the introduction.

In order, with such a current differential protection arrangement, to be able to obtain trigger signals rapidly and reliably in the case of an internal fault on the section of an electrical power supply system that is to be monitored, according to an embodiment of the invention, the measured value preprocessing device is designed in such a way that it generates differential current instantaneous values and stabilization current instantaneous values. Furthermore, a first limit value stage is arranged downstream of a first differentiator, to which stabilization current instantaneous values are applied, which limit value stage is also connected to a differential current quotient limit value transmitter on the input side. A second limit value stage is arranged downstream of a second differentiator, to which differential current instantaneous values are applied, which limit value stage is also connected to the differential current quotient transmitter on the input side, and the logic circuit is arranged downstream of the limit value stages and generates the trigger signal when output signals of the limit value stages are present.

In further advantageous configurations of this current differential protection arrangement, the construction of the current differential protection arrangement according to the invention is expediently effected overall by means of a data processing device.

BRIEF DESCRIPTION OF THE DRAWINGS

For a further explanation of the invention and of the current differential protection arrangement according to the invention.

DETAILED DESCRIPTION OF THE PREFERRED EMBODIMENTS

Figure 1:
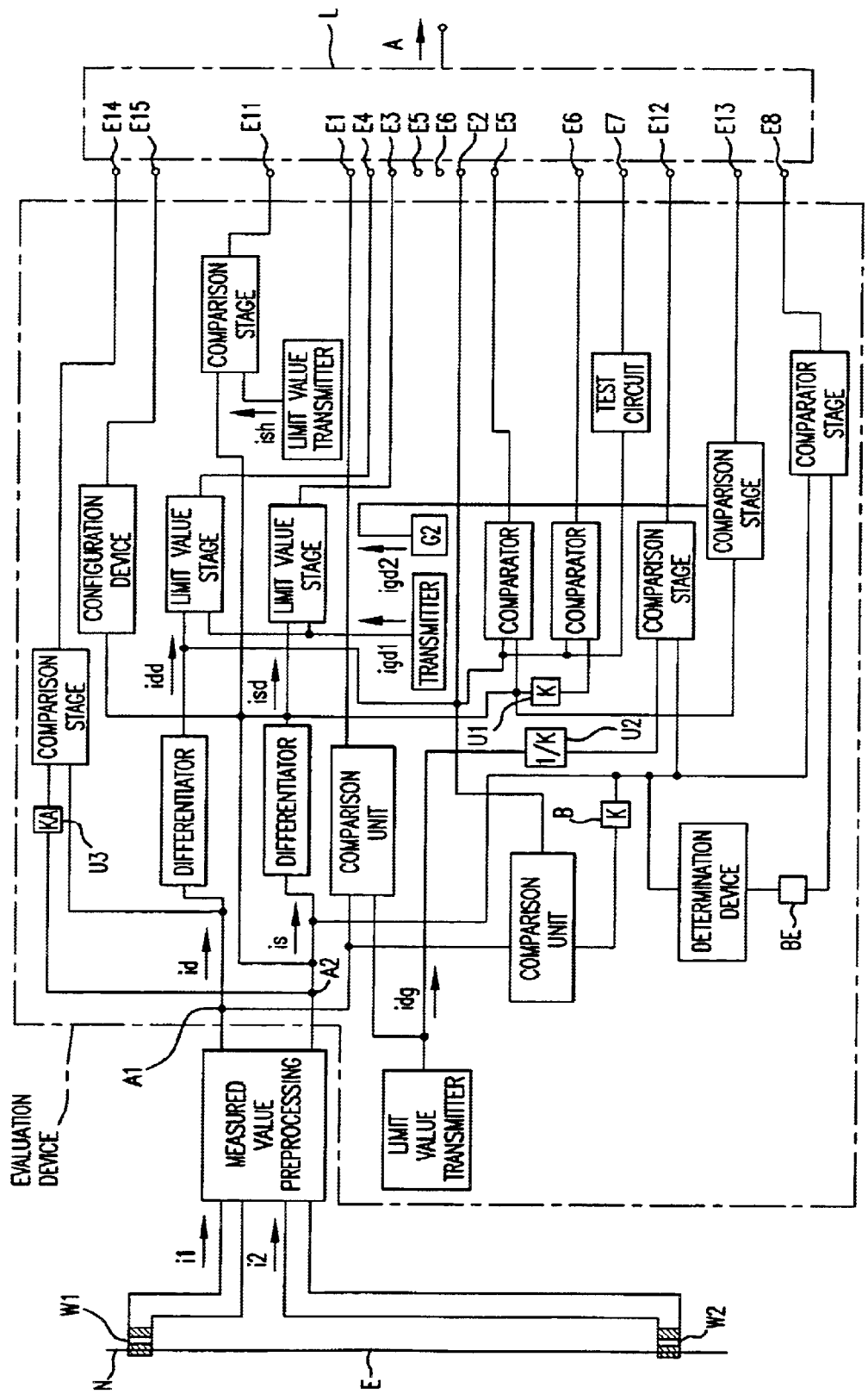
FIG. 1 represents a block diagram for describing the sequence of an exemplary embodiment of the method according to the invention.

FIG. 1 shows a section E of a power supply system N, which section is to be monitored for faults and is bounded by current transformers W1 and W2. By means of the current transformers W1 and W2, secondary currents i1 and i2 which are proportional to the currents through the primary windings of the transformers are obtained and are fed to a measured value preprocessing device MV with evaluation device AW arranged downstream.

The measured value preprocessing device MV includes, inter alia, low-pass filters which eliminate changes in the currents i1 and i2 which are caused for example by external electromagnetic influencing. Furthermore, differential current instantaneous values id are formed in the measured value preprocessing device MV in accordance with equation (1) below.

$$id=|(i1, i2)| \tag{1}$$

Stabilization current instantaneous values is are also generated in the measured value preprocessing device MV in accordance with equation (2) below.

$$is=\Sigma|i1||i2| \tag{2}$$

According to the theory, through consideration of the currents id and is, a fault-free section E can be inferred if the differential current id is zero. A fault on the section E is given when the differential current id has the same magnitude as the stabilization current is. In practice, however, the conditions are considerably more complicated because, during the detection of the secondary currents i1 and i2, measurement errors occur as a result of the use of the current transformers W1 and W2. These measurement errors are particularly large when the current transformers W1 and W2 enter into saturation, which may be the case when there is a short circuit in the power supply system N with accompanying short-circuit currents.

In practice, therefore, it is assumed in the case of a fault on the section E that then $$id>idg \tag{5}$$

$$id>K \cdot is \tag{6}$$

In this case, idg denotes a limit value of the differential current id. K designates a characteristic curve factor whose magnitude, in a known manner, lies between zero and 1. This characteristic curve factor K takes account of the fact that measurement errors during the detection of the currents i1 and i2 can become larger with increasing current on the section E and that normal load currents flowing via the section E can be superposed on the fault current and differential impedances of connected lines can bring about phase differences. Under the customary operating conditions of the power supplies, adequate stability of a current differential protection arrangement working with these criteria can be achieved if the differential current limit value idg and the characteristic curve factor K are set high enough. However, it should be taken into account that a satisfactory sensitivity for the application is ensured by setting these quantities low enough.

In the exemplary embodiment according to FIG. 1, equations (5) and (6) are taken into account by virtue of the fact that a comparison arrangement VA1 of the evaluation device AW is connected by an input to an output A1 of the measured value preprocessing device MV, the output carrying differential current instantaneous values id. The comparison arrangement VA1 is connected by its other input to a limit value transmitter G1g, which, at its output, outputs a measurement quantity proportional to the differential current limit value igd. Moreover, a further comparison arrangement VA2 is connected by one of its inputs to the output A1 of the measured value preprocessing device MV. A further input of the further comparison arrangement VA2 is connected to a further output A2 of the measured value preprocessing device MV via a weighting stage V. Stabilization current instantaneous values is occur at the output A2.

If equation (5) is satisfied, then the comparison arrangement VA1 outputs an actuation signal to an input E1 of a logic circuit L arranged downstream of the evaluation device AW. If equation (6) is satisfied, then the further comparison arrangement VA2 supplies an actuation signal to an input E2 of the logic circuit L.

In the exemplary embodiment illustrated, the logic circuit L, whose function will be described in detail below, does not already generate a trigger signal A when actuation signals of the comparison arrangements VA1 and VA2 are present at the two inputs E1 and E2, rather further conditions—described in more detail below —must also be met for the outputting of the trigger signal A.

In order to check the further conditions, a first differentiator DS is connected to the further output A2 of the measured value preprocessing device MV, which differentiator generates, at its output, a first measurement quantity isd, which is proportional to the differential quotient of the stabilization current is with respect to time. This first measurement quantity isd is fed to one input of a first limit value stage Gs, whose other input is connected to a differential current quotient limit value transmitter G1. The transmitter G1 prescribes a limit value of the differential quotient of the differential current id with respect to time, which is referred to below for short as differential current quotient limit value igd1. If the first measurement quantity isd is greater than the differential current quotient limit value igd1, that is to say if the relationship (7)

$$isd > igd1 \quad (7)$$

holds true, then the first limit value stage Gs outputs, on the output side, a further actuation signal to an input E3 of the logic circuit L.

Moreover, a second differentiator Dd is arranged downstream of the first output A1 of the measured value preprocessing device MV, which differentiator generates, at its output, a second measurement quantity idd, which corresponds to the differential quotient of the differential current id with respect to time. This second measurement quantity idd is present at an input of a second limit value stage Gd, whose other input is likewise connected to the first transmitter G1. If the second measurement quantity idd is greater than the differential current limit value igd1, that is to say if equation (8) below $$idd > igd1 \quad (8)$$

holds true, then the second limit value stage Gd outputs an additional actuation signal to an input E4 of the logic circuit L.

By virtue of the additional signals at the inputs E3 and E4, the invention has already become comparatively secure with regard to undesirable incorrect triggering. However, it can be configured even more securely in terms of its function and with regard to the avoidance of incorrect triggering if a further relationship (9) is taken into account, this being presented below.

$$isd > idd \quad (9)$$

In FIG. 1, to that end a first comparator K1 is provided, which is connected by one of its inputs to the output of the second differentiator Dd and to which the second measurement quantity idd is thus applied. A further input of the first comparator K1 is connected to the output of the first differentiator Ds and therefore has the first measurement quantity isd applied to if. If relationship (9) above is fulfilled, then the first comparator K1 outputs an additional actuation signal to an input E4 of the logic circuit L.

A second comparator K2 is connected by its output to a further input E6 of the logic circuit L, the comparator serving for the evaluation of relationship (10) below.

$$idd > K \cdot isd \quad (10)$$

For this purpose, the second comparator K2 is connected by one input to the output of the second differentiator Dd. A further input of the second comparator K2 is connected to the output of the first differentiator Ds via an evaluation stage U1. If condition (10) is met, then the second comparator K2 outputs an actuation signal to the input E6 of the logic circuit L.

Furthermore, in the exemplary embodiment according to FIG. 1, a test circuit P is provided, which is connected by its input to the output of the second differentiator Dd and checks whether the second measurement quantity idd is greater than zero. If this is the case, then it outputs a pulse to an input E7 of the logic circuit L. A further input E8 of the logic circuit L is connected to an output of a comparator stage VS. The stabilization current is applied to one input of the comparator stage, while its other input is connected to a determination device U via a weighting device BE. The stabilization current is applied to the determination device on the input side and the determination device ascertains the presently smallest value ismin and the largest value ismax of the stabilization current is. If relationship (11) below is fulfilled $$0.5 is\ max < is > KMIN \cdot is\ min \quad (11)$$

then the comparison stage VS outputs a signal to the logic circuit L via the input E8.

The logic circuit L additionally has inputs E11, E12, E13, E14 and E15. A first comparator stage V1 is connected to the input E11, which comparator stage, on the input side, is connected to the output A2 of the measured value preprocessing device MV and a second limit value transmitter G2g. The comparator stage V1 checks whether relationship (12) is complied with:

$$is > ish \quad (12)$$

If this is the case, then an inhibit signal is output to the input E11.

The output of a second comparison stage V2 is connected to the input E12. The second comparison stage V2 is connected by one of its inputs, via a translation stage U2 (factor 1/K), to the limit value transmitter G1g for the differential current quotient limit value idg, while the stabilization current is applied directly to the other input. Consequently, the following condition (13) is checked by means of the second comparison stage V2 using a first reweighted limit value idg/K:

$$is > idg/K \quad (13)$$

If this condition and, simultaneously with a second reweighted limit value 1.5*idg, the condition is >1.5*idg are met, then an inhibit signal occurs at the input E12 of the logic circuit L.

On the input side, a third comparison stage V3 is connected, on the one hand, to the output of the first differentiator Ds and, on the other hand, to the output of the second transmitter G2. On the output side, the third comparator stage V3 is connected to the input E13 of the logic circuit L and outputs to the latter an inhibit signal when the following condition (14) is met:

$$isd > igd2 \quad (14)$$

On the input side, a fourth comparison stage V4 is connected, on the one hand, to the further output A2 of the measured value preprocessing device MV via a further translation stage U3 (factor KA) and also, on the other hand, directly to the first output A1 of the measured value preprocessing device MV. On the output side, the fourth comparison stage V4 is connected to an input E14 of the logic circuit L and outputs an inhibit signal to this input if the following relationship (15) is satisfied:

$$id < KA \cdot is \quad (15)$$

Finally, a comparator device VE checks whether relationships (16) and (17) below are satisfied:

$$is > KMIN \cdot is \text{ min} \quad (16)$$

$$is > 0.5 \cdot is \text{ max} \quad (17)$$

For this purpose, on the input side, the comparison device VE is directly connected to the output A2 of the measured value preprocessing device MV. On the output side, the comparison device VE is connected to the input E15 of the logic circuit L. In the comparator device, a calculated comparison value is determined by subtracting a comparison value from the root-mean-square value of the stabilization current isrms. The calculated comparison value is compared with the instantaneous value of the stabilization current is.

Figure 2:
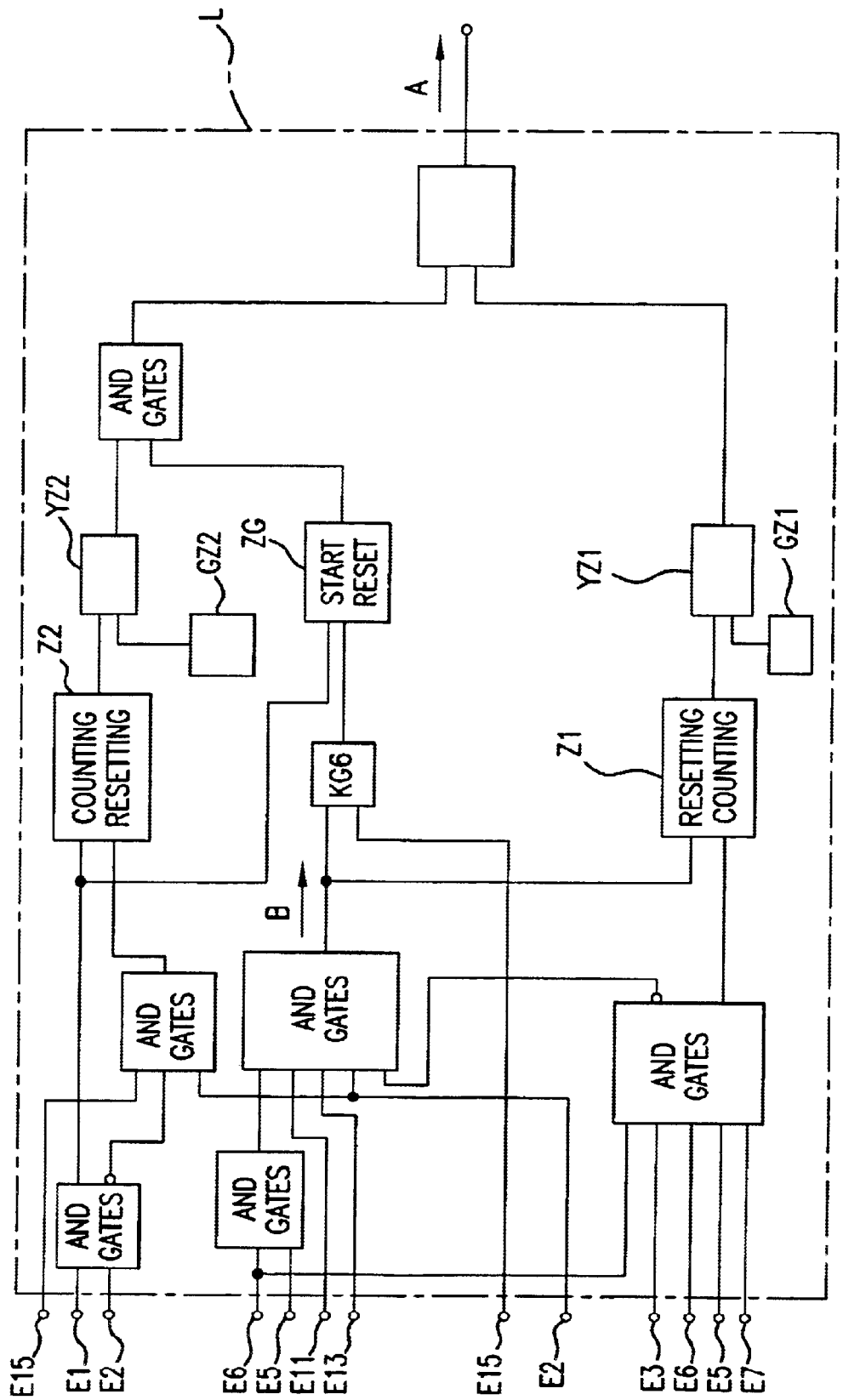
FIG. 2 represents an embodiment of a logic circuit of the block diagram in accordance with FIG. 1.

As revealed by FIG. 2, the logic circuit L arranged downstream of the evaluation device AW has, on the input side, a plurality of AND gates UG1 to UG5, which, on the input side, are connected to the inputs E1 to E14 of the logic circuit in the manner which can be seen from FIG. 2. If the first measurement quantity isd is less than the predetermined differential current quotient limit value igd1 and less than the second measurement quantity idd and if, moreover, the second measurement quantity idd does not exceed the limit value and it is smaller than the first measurement quantity isd weighted with the characteristic curve factor k, then an inhibit signal B is generated at the output of the AND element UG5 if the conditions $$isd > igd2$$

$$idd > k \cdot isd$$

are met and the following simultaneously holds true for the instantaneous value of the stabilization current is:

$$is > ish$$

$$is > idg/k$$

$$is > 1.5 \cdot idg$$

$$is > im$$

In this case, im designates a comparison value which is calculated from previous root-mean-square values of the stabilization current is plus a threshold value. The inhibit signal B thus occurs in the case of an external fault with regard to the section E of the power supply system N that is to be monitored.

The inhibit signal B is applied, on the one hand, to a further AND element UG6 and, on the other hand, to a counter Z1—forming a high-speed stage—at its reset input, so that, when the inhibit signal B occurs and there is a signal at the input E15, a timer ZG is reset and the counter Z1 is also reset. As a result, a further counter Z2 is activated, which acts as a timing stage and, in the event of a counter reading greater than the count Nz, predetermined by a transmitter GZ2, outputs a signal to an OR element OG via a comparator VZ2 and an additional AND element UG7.

The high-speed stage by means of the counter Z1 is activated if it is determined, in a comparator VZ1 connected downstream, that a counter reading which is greater than a predetermined count Ns of a further transmitter GZ1 has been reached in the counter Z1. In this case, Ns is chosen to be considerably smaller than Nz. If the counter reading of the counter Z1 is greater than Ns, the trigger signal A is generated.

What is claimed is:

1. A method for generating a trigger signal based on a current differential protection when a fault occurs on a section of an electrical power supply system, comprising:

monitoring differential current values for a predetermined lower limit value of the differential current and stabilization current values weighted with a characteristic curve factor, and generating the trigger signal if the differential current values exceed the predetermined lower limit value and stabilization current values and are present simultaneously, calculating the differential current values and the stabilization current values with instantaneous values of the currents detected at the section of the electrical power supply system, forming and checking a first measurement quantity, which is proportional to a differential quotient of the stabilization current with respect to time, in an evaluation operation to determine whether the first measurement quantity exceeds the predetermined limit value of the differential quotient of the differential current with respect to time, forming and checking a second measurement quantity, which is proportional to a differential quotient of the differential current with respect to time, in another evaluation operation to determine whether the second measurement quantity exceeds the differential current quotient limit value, and generating the trigger signal if the forming and checking operations each produce a positive result at the same time as the two instances of monitoring.

2. The method as claimed in claim 1, wherein a check is made to determine whether the first measurement quantity is greater than the second measurement quantity, and if so, the trigger signal is generated.

3. The method as claimed in claim 1, wherein a check is made to determine whether the second measurement quantity exceeds the first measurement quantity weighted with a characteristic curve factor and if so, the trigger signal is generated.

4. The method as claimed in claim 1, wherein
the smallest value of the stabilization current is determined in each case in a time range in which the first measurement quantity becomes less than zero,
the largest value is determined in each case in a time range in which the first measurement quantity becomes greater than zero, and
a check is made to determine whether the stabilization current is greater than KMIN times the smallest value, where 1<KMIN<√2, and 0.5 times the value of the largest value, and,
if so, the trigger signal is generated.

5. The method as claimed in claim 1, wherein the trigger signal is generated if the evaluation operations and the instances of monitoring yield positive results Ns times in succession, where Ns is freely selectable.

6. The method as claimed in claim 5, wherein in the absence of Ns results, the trigger signal is generated when at least the instances of monitoring have produced positive results Nz times, where Ns<<Nz.

7. The method as claimed in claim 1, wherein in the absence of a trigger signal (A), an internal inhibit signal is generated if—the first measurement quantity is greater than the limit value of this quantity,
and the second measurement quantity is less than the instantaneous value—weighted with the k factor—of the first measurement quantity and, at the same time, the instantaneous value of the stabilization current greater than
a limit values,
a first reweighted limit value,
a second reweighted limit value, and
a comparison value calculated as mean value from previous values.

8. The method as claimed in claim 7, wherein after the generation of an inhibit signal, a trigger signal is generated when the instances of monitoring and/or the instances of evaluation have produced a positive result at least Nz times.

9. A current differential protection arrangement for a section of an electrical power supply system comprising:
a measured value preprocessing device, in which respective differential current values and stabilization current values respectively assigned thereto are formed continuously from currents detected at the ends of the sections, the measured value preprocessing device is configured such that it generates differential current instantaneous values and stabilization current instantaneous values;
an evaluation device connected downstream of the measured value preprocessing device,—in which evaluation device the differential currents is checked to determine whether it exceeds a predetermined differential current limit value;
a logic circuits, which, on the input side, is connected to the evaluation device and has an output for outputting a trigger signal;
a first limit value stage arranged downstream of a first differentiator, to which stabilization current instantaneous values are applied, which limit value stage is connected to a differential current quotient limit value transmitter on the input side; and
a second limit value stage arranged downstream of a second differentiator, to which differential current instantaneous values are applied, which limit value stage is connected to the differential current quotient transmitter on the input side, wherein
the logic circuit is arranged downstream of the limit value stages and generates the trigger signal when output signals of the limit value stages are present.

10. The current differential protection arrangement as claimed in claim 9, further comprising a first comparator connected to the two differentiators and, on the output side, connected to the logic circuits.

11. The current differential protection arrangement as claimed in claim 7, further comprising a second comparator indirectly arranged downstream of the first differentiator via a translation stage and of the second differentiator and connected to the logic circuit on the output side.

12. The current differential protection arrangement as claimed in claim 9, wherein
a determination device for the smallest value of the stabilization current provided,
a weighting device is connected to the determination device, and
a comparison stage is arranged downstream of the weighting device, to which comparison stage, on the input side, the stabilization current instantaneous values are applied and which comparison stage is connected to the logic circuit on the output side.

13. The current differential protection arrangement as claimed in claim 9, further comprising:
a first comparison stage arranged downstream of a transmitter for the differential current quotient limit value and a second transmitters for the stabilization quotient limit value, which comparison stage is connected to the logic circuit on the output side,
a second comparison stage connected, on the input side, to the input of the first differentiator and, via another translation stages, to a transmitter for the limit value of the differential current and connected to the logic circuit on the output side,
a third comparison stage connected, on the input side, to the output of the first differentiator and to the output of the another transmitter and connected to the logic circuit on the output side,
a fourth comparison stage is connected, on the input side, to the input of the second differentiator and, via a third translation stage, to the input of the first differentiator and connected to the logic circuit on the output side, and
a fifth comparison stage connected, on the input side, to the output of the second differentiator and, via a fourth translation stage, to the output of the first differentiator and connected to the logic circuit on the output side.

* * * * *